United States Patent [19]
Borns

[11] 3,746,363
[45] July 17, 1973

[54] SUSPENSION FOR LAND VEHICLES
[75] Inventor: David R. Borns, Muskegon, Mich.
[73] Assignee: Lear Siegler, Inc., Santa Monica, Calif.
[22] Filed: Mar. 29, 1971
[21] Appl. No.: 128,948

[52] U.S. Cl. ......... 280/124 A, 267/15 R, 280/81 R, 280/96.2 B, 280/34, 280/124 F
[51] Int. Cl. ............................................. B62d 17/00
[58] Field of Search ............. 280/80 R, 80 A, 80 B, 280/81 R, 81 A, 150 A, 64, 124 R, 124 A, 96.1, 96.2 R, 96.2 A; 267/15 R

[56] References Cited
UNITED STATES PATENTS
3,201,142  8/1965  Dangauthier ............... 280/124 A X
3,093,388  6/1963  Kulyu ................................... 280/81
3,173,707  3/1965  Péras ............................. 280/124 A
3,096,994  7/1963  Primeau et al ..................... 280/96.1
2,299,087  10/1942  Goetz ............................ 280/96.2 R
2,065,071  12/1936  Harris ........................... 280/96.2 R Primary Examiner—Kenneth H. Betts
Assistant Examiner—John P. Silverstrim
Attorney—Barnes, Kisselle, Raisch & Choate

[57] ABSTRACT

Suspension for an individual wheel of a vehicle wherein a control arm pivotally mounted for vertical swinging on the vehicle frame has a laterally extending wheel spindle, a load-transmitting spring being interposed between the control arm and frame. The mounting includes a receptacle and insert which interfit loosely to facilitate toe-in and camber adjustment by shifting the control arm and which are then welded together. The control arm and its pivot of themselves control lateral and torsional forces on the arm. A bumper mountable on another vehicle is apertured to receive a hasp associated with the suspension and a locking pin to provide a draft and vertical load-transmitting coupling between the vehicles.

10 Claims, 10 Drawing Figures

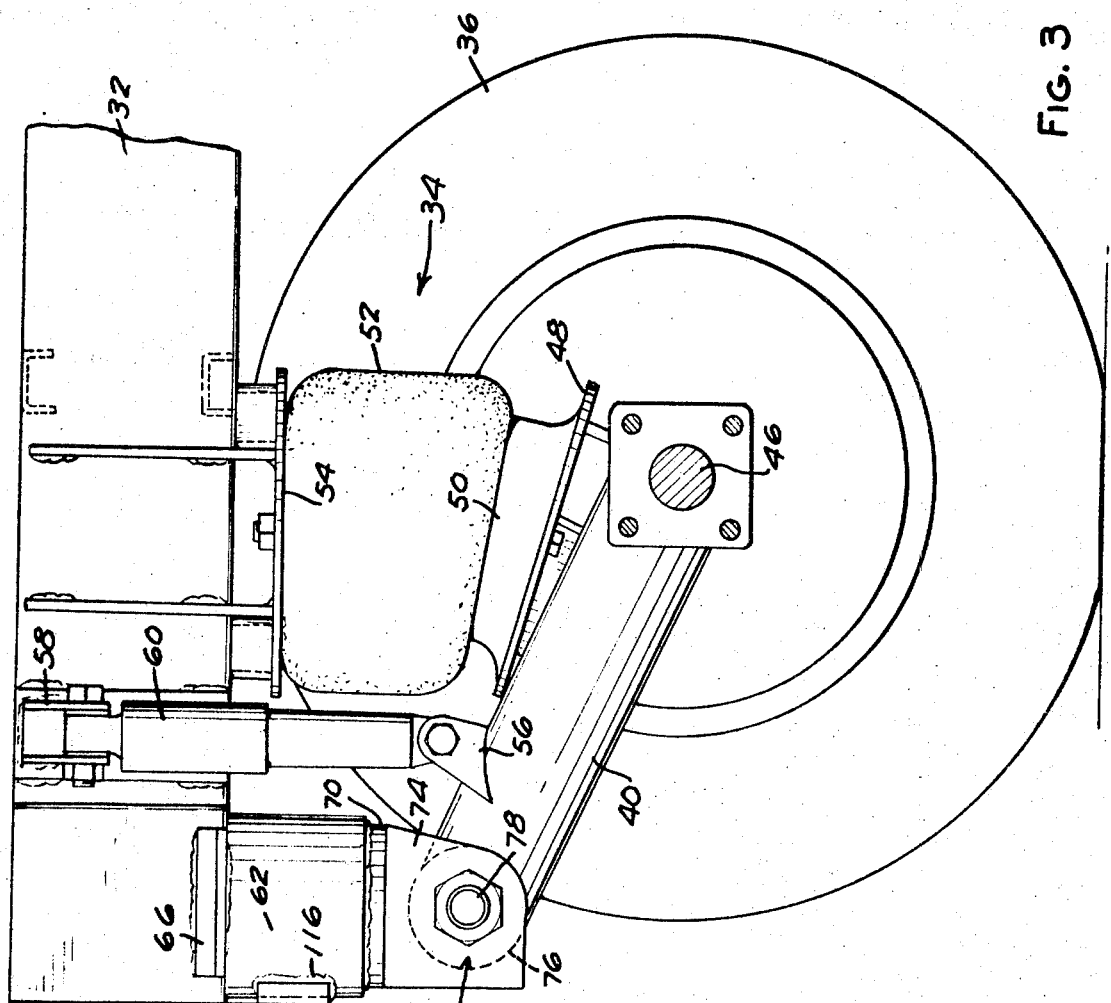
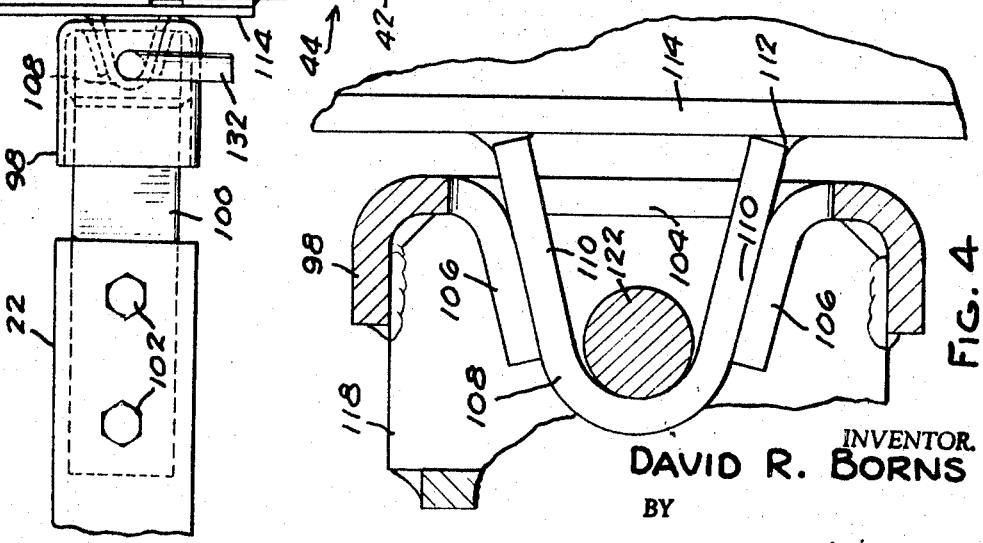
INVENTOR.
DAVID R. BORNS
BY
Barnes, Kisselle, Raisch & Choate
ATTORNEYS

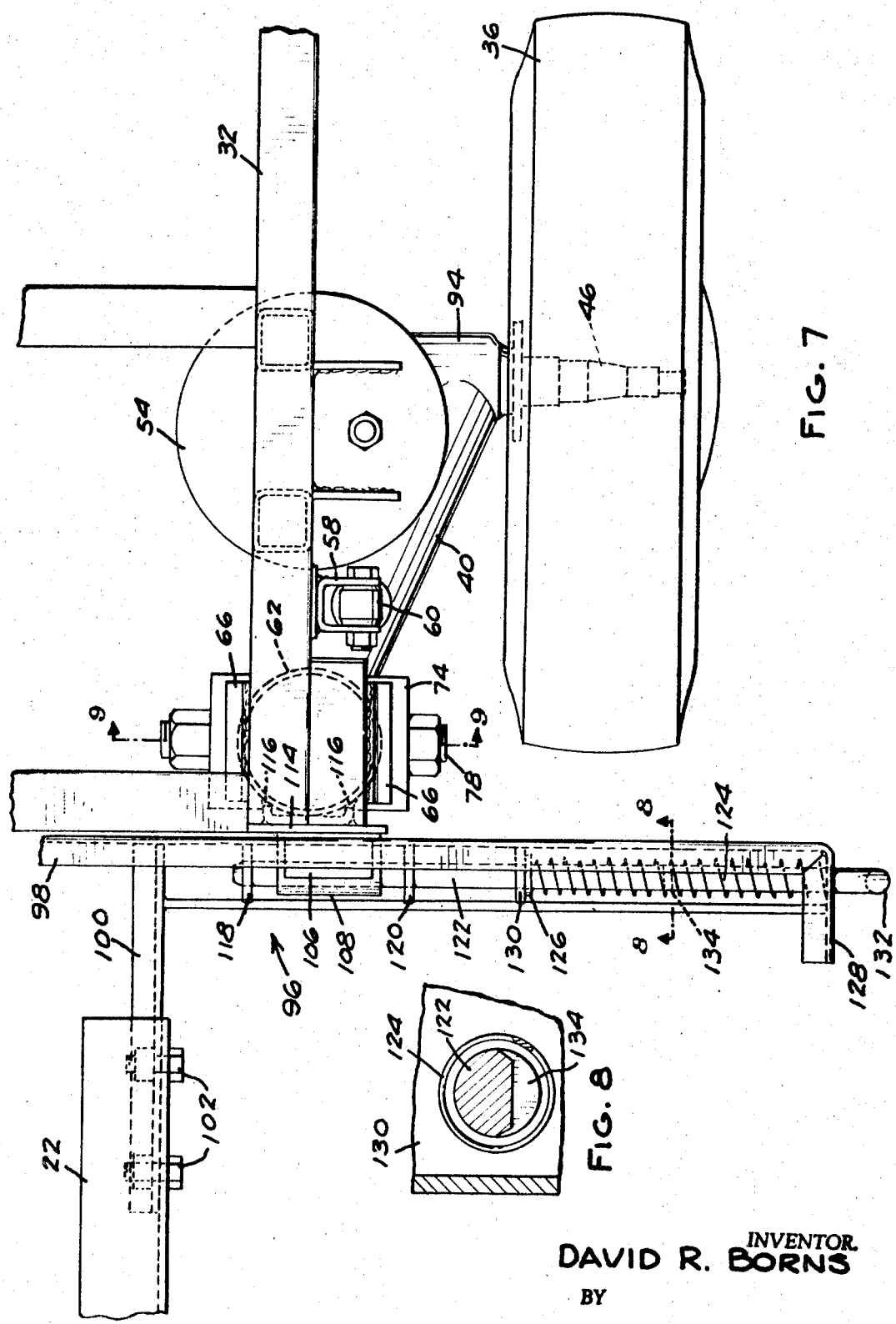

PATENTED JUL 17 1973

INVENTOR
DAVID R. BORNS
BY
Barnes, Kisselle, Raisch & Choate
ATTORNEYS

SUSPENSION FOR LAND VEHICLES

This invention relates to a suspension for an individual wheel of a land vehicle. More particularly, the invention involves a suspension of the type wherein a control arm is pivotally mounted so that it can swing in a vertical direction with respect to the vehicle frame, an axle for a ground-engaging wheel being mounted on the control arm and a spring being mounted in load-transmitting relation between the control arm and vehicle frame.

Selected for illustration of the invention is a camper body of the type which is adapted to be mounted within and carried by the box-like cargo body of a pickup truck. Such camper bodies are frequently considerably longer than and extend rearwardly a distance beyond the cargo box. A suspension according to the present invention is disclosed herein as being mounted in supporting relation to the overhanging portion of such a camper body.

Heretofore, suspensions utilized for such purposes have employed a conventional through axle on which both wheels are mounted and conventional mechanical springs. Such springs are designed for a particular load range. When the load carried is toward the low end of this range, the springs provide a relatively stiff or rough ride for the portions of the vehicle which they support. Toward the upper end of the load range, the springs tend to provide unstable support for the vehicle; and should the load exceed the designed range, the suspension becomes very unstable. In addition, the through axle limits the available road clearance or floor space between the wheels.

The object of the present invention is to provide a relatively simple, economical suspension structure which is improved to provide a soft though stable ride throughout an increased load range; to provide maximum usable vertical space between the wheels; convenient means for adjusting toe-in and camber of the wheels; and a relatively simple, economical, and conveniently operable draft and vertical load-transmitting coupling between the suspended vehicle and another vehicle with which the suspended vehicle is adapted to be used.

In general, the invention contemplates suspending each wheel individually by a vertically swingable control arm with an outwardly extending wheel spindle thereon, a spring (preferably an air spring) being disposed in load-transmitting relation between the control arm and vehicle frame. The air spring is inflatable selectively to different pressures commensurate to the load being carried to provide a soft though stable ride for that load.

The control arm mount includes two members which initially interfit loosely so that the control arm can be shifted laterally and about its axis to adjust toe-in and camber respectively. The two members have portions which are weldable together after the adjustments have been effected. The control arm and its pivot are so constructed that they of themselves control forces in the suspension in directions lateral and torsional of the control arm, thereby maintaining the proper toe-in and camber of the wheels.

The suspended vehicle may be coupled to another vehicle by means of a bumper mountable on the other vehicle and being apertured to receive a hasp associated with the suspension and a locking pin which anchors the hasp and bumper together. The coupling transmits both draft and vertical load forces between the vehicles.

One form of the invention is shown in the accompanying drawings.

FIG. 3 is a fragmentary side elevational view of the suspension on an enlarged scale.

FIG. 4 is an enlarged sectional view on line 4—4 of FIG. 5.

FIG. 7 is a top plan view of the structure shown in FIGS. 3 and 5.

FIG. 8 is an enlarged sectional view on line 8—8 of FIG. 7.

Figure 1:
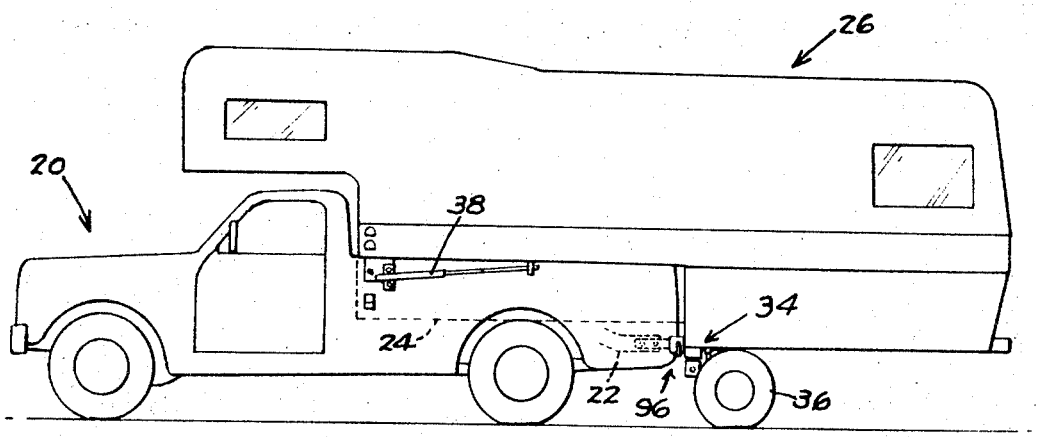
FIG. 1 is a generally side elevational view of a pickup truck and camper body to which a suspension according to the present invention has been applied.

Shown in FIG. 1 is a vehicle 20 popularly known as a pickup truck having a frame 22 upon which is supported an open-top cargo box 24. Truck 20 is the prime mover for a camper body 26. The camper body has a central floor area 28 which fits within cargo box 24 and sills 30 which extend over the sides of the cargo box. As shown, the camper body is of such a length that it extends considerably beyond the rearward end of box 24. The rearwardly extending portion of the camper body is provided with frame members 32 along its sides upon which suspension units 34 according to the present invention are mounted, and ground-engaging wheels 36 are mounted on these units.

The forward end portion of the camper body is secured to truck 20 by conventional means (not illustrated) and when the truck is withdrawn from beneath the camper body, its forward end is supported by conventional retractable legs 38.

Each suspension unit 34 comprises a control arm 40 pivotally connected at 42 to a mounting assembly 44 anchored on a frame member 32 so that the control arm can swing up and down relative to the frame. A wheel spindle 46 extends laterally outwardly of control arm 40 adjacent its free end, and wheel 36 is mounted thereon. Control arm 40 carries a pedestal or platform 48 upon which is mounted the piston member 50 of an air spring 52 whose upper end is secured to a platform 54 on frame 32. The control arm and frame are provided respectively with brackets 56 and 58 to which are connected the ends of a telescoping-type shock absorber 60.

Figure 9:
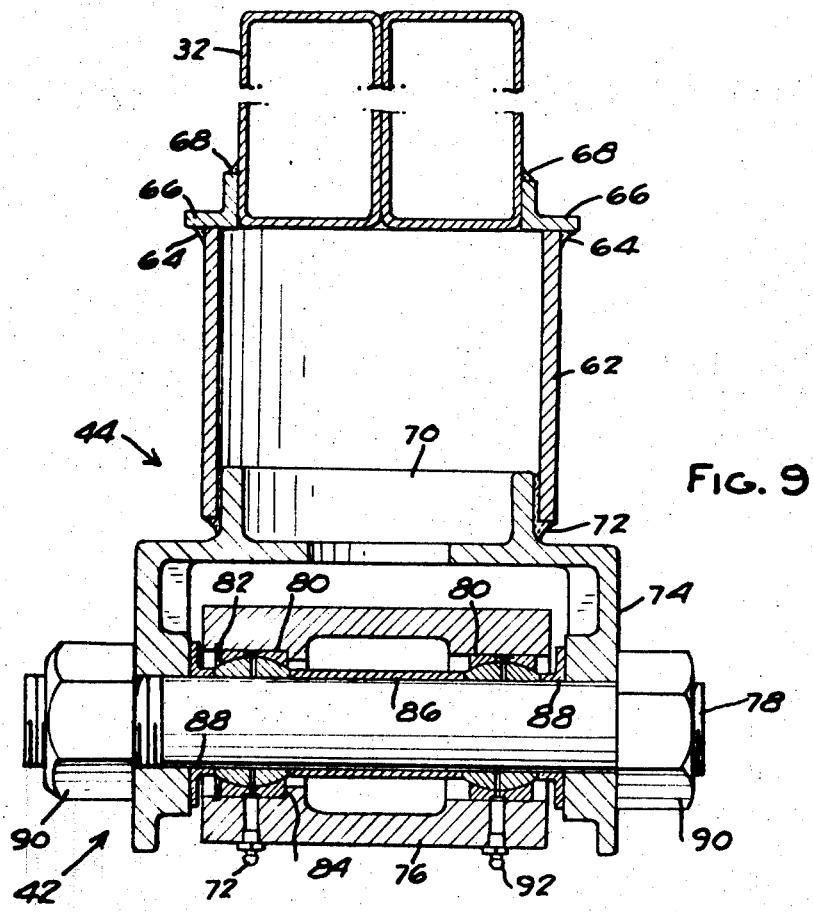
FIG. 9 is an enlarged sectional view on line 9—9 of FIG. 7.

Mounting assembly 44 includes a cylindrical receptacle 62 anchored to frame 32 by suitable means such as welding 64 to angle members 66 in turn welded to frame 32 at 68. Assembly 44 also includes a cylindrical insert 70 which fits with considerable clearance within the lower end portion of receptacle 62 as shown in FIG. 9 for a purpose to be described. The lower end portions of receptacle 62 and portions of the insert 70 adjacent its base are welded together at 72.

Insert member 70 has a downward extension which is bifurcate to form a yoke 74 providing one member of pivot 42. An end portion 76 of control arm 40 is disposed within yoke 74 and a pivot bolt 78 extending through aligned openings therein secures the yoke and arm together. Two steel bearings 80 are provided between pivot bolt 78 and arm 40. One bearing is positioned longitudinally of the bolt by a retainer ring 82 at one side and a shoulder 84 at the other side, and a spacer sleeve 86 is provided between the two bearings. Spacer collars 88 are provided between each bearing 80 and yoke 74.

Pivot bolt 78 is provided with tightening nuts 90 at each end; and when these nuts are tightened, yoke 74 causes spacers 88 to tighten axially against bearings 80, the right-hand bearing 80 of FIG. 9 being free to shift in its opening for tightening against sleeve 86.

As shown in FIG. 9, the interengaged faces of the bearing members 80 are spherical and have relatively large radii. This feature, coupled with the distance between the bearings as provided by spacer 86 and provision for lubrication of the bearings through fittings 92, results in a bearing structure which is substantially unyielding to and capable of withstanding relatively large lateral and torsional forces on control arm 40 during the course of use of suspension 34. An advantage of this feature is discussed in more detail below.

Control arm 40 is preferably made of relatively heavy gauge tubular steel, and welded to the free end of the steel tube is a transverse tubular member 94. Wheel spindle 46 is in turn welded to transverse tube 94. Thus, control arm 40 and wheel spindle 36 have unitary structure which minimizes the amount of deflection thereof during use.

A coupling assembly 96 is provided for coupling suspension 34 with frame 22 of truck 20. This assembly includes a bumper 98 secured to a pair of frame extensions 100 (only one being illustrated) adapted to be bolted as at 102 to truck frame 22. Bumper 98 has a pair of openings 104 aligned with the forward ends (as the drawings are viewed) of suspension units 34, the upper and lower edges of these openings being defined by portions of the bumper metal folded inwardly at an angle to provide load-bearing elements 106 as best shown in FIG. 4. Each suspension unit 34 is provided with a forwardly extending hasp 108 having upper and lower angled sides 110 which provide load bearings mating with bearings 106. Each hasp is mounted on its respective suspension unit by suitable means such as welding 112 to a plate 114 in turn welded to cylindrical receptacle 62 at 116.

Bumper 98 is illustrated as being channel shaped, and a pair of webs 118, 120 extend across the channel flanking each bearing element 106. These webs are apertured in alignment with the apex of hasp 108, and a locking pin 122 passes slidably therethrough. Each locking pin is urged toward locked position by a spring 124 compressed between a collar 126 on the pin and an end 128 of bumper 98 having an opening 129 through which the pin slidably extends. Collar 126 engages another apertured web 130 which extends across the channel of the bumper to limit inward movement of the pin under the force of spring 124. Each pin 122 is provided at its outer end with a handle 132 and is provided with a detent notch 134 (FIGS. 7, 8) engageable with a side of the opening 129 to retain pin 122 in retracted position.

To assemble a suspension unit 34 on a vehicle such as camper body 26, receptacle 62 is assembled on frame 32 by means of angles 66 and welding 64, 68. After yoke 74, control arm 40, and bearings 88 have been assembled, insert 70 is inserted into the lower end of receptacle 62. Control arm 40 is then shifted laterally or in a horizontal direction until wheel spindle 46 is properly positioned at its desired toe-in. Insert 70 rotates generally coaxially within receptacle 62 during this adjustment, the axis of rotation being generally vertical in the form of the invention illustrated.

Figure 10:
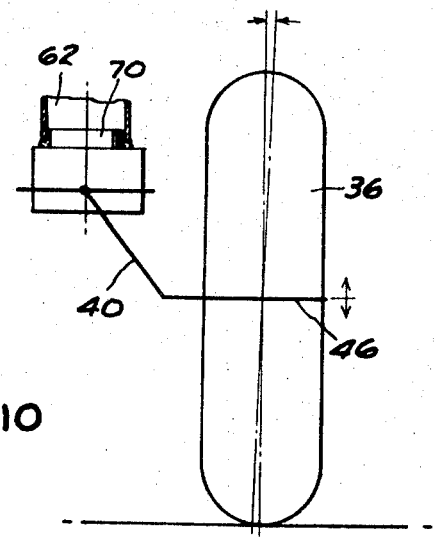
FIG. 10 is a diagrammatic view illustrating a camber adjustment.

The control arm is also tilted one way or the other about its longitudinal axis to provide wheel spindle 46 with its proper camber angle. Because of the clearance between insert 70 and the interior of receptacle 62, the insert tilts within the receptacle to facilitate this adjustment which is illustrated diagrammatically in FIG. 10. Wheel spindle 46 tilts upwardly or downwardly so that the plane of wheel 36 tilts relative to a vertical plane as illustrated.

Then the lower end portion of receptacle 62 and the portions of receptacle 70 adjacent its base are welded together at 72 to fix control arm 40 and wheel spindle 46 in properly adjusted positions of toe-in and camber. Shock absorber 60, air spring 50, 52, and wheel 36 are added at any convenient point in the assembly to complete the suspension.

If the suspension is applied to a vehicle such as camper 26 which is to be used in conjunction with another vehicle such as pickup truck 20, mounting plate 114 and its hasp 108 are secured in place at any convenient point during the assembly. Frame extensions 100 are bolted to truck frame 22 to mount bumper 98 on the truck.

In use, let it be assumed that truck 20 and camper 26 are uncoupled with legs 38 supporting the forward end of the camper and suspension units 34 supporting the rearward end. To couple the two vehicles, truck 20 is backed toward the camper body so that the floor area 28 enters cargo box 24. Upon terminal rearward movement, hasps 108 enter bumper openings 104 and load-bearing members 110, 106 of the hasp and bumper respectively interengage as shown in FIGS. 3 and 4.

During this maneuver, each locking pin 122 is held retracted by engagement of detent notch 134 therein with a side of bumper opening 129. By means of handle 132, each locking pin 122 is shifted sideways to disengage the detent notch and under the urging of spring 124, each pin 122 advances through the openings in web 120, hasp 108, and web 118. The two vehicles are now coupled together to form what may be regarded as a single composite vehicle. After legs 38 are retracted, the composite vehicle is ready for travel.

Vertical load of the vehicle is transmitted from frame 32 through air spring 50, 52, control arm 40, and spindle 46 to wheel 36. The cantilever mounting of wheel spindle 46 creates relatively high torsional forces in control arm 40; and in addition, during road use relatively high lateral forces are exerted on control arm 40 whenever vehicle 20, 26 travels or tends to travel in a non-linear direction. Air spring 50, 52 being essentially an inflated bag provides virtually no support against these forces.

All such forces are absorbed and controlled of themselves by control arm 40, pivot structure 42, yoke 74, insert 70, and receptacle 62. The unitary structure of wheel spindle 46 and control arm 40 together with nonyielding bearings 88 and mounting assembly 44 renders the suspension unit sufficiently rigid to maintain the proper toe-in and camber angles of wheel 36 during road use.

Locking pins 122 and their cooperating hasps 108 and apertured webs 118, 120 form a draft connection between truck 20 and camper 26. In addition, vertical interengagement of hasp 108 and bumper members 110, 106 provides a vertical load-transmitting coupling between truck frame 22 and suspension units 34. Thus, the suspension units not only support the load of the rearward overhanging end of camper 26 but also provide in effect an auxiliary suspension for the rearward end of truck 20.

The use of individual suspension units 34 provides maximum vertical clearance between the road and the bottom of camper 26. This clearance can be left free as shown for use on rutted roads, or this clearance could be utilized, for example, to accommodate a drop floor in the camper body.

By means of suitable conventional equipment, air springs 50, 52 are inflated to a pressure which is adequate to support the load carried by suspension units 34 and when so inflated, they provide excellent anti-roll stability. At the same time, they provide the supported vehicle with a soft ride.

In a typical light-duty suspension according to the present invention a pair of suspension units 34 would be designed to carry a maximum load of 3,500 lbs. at an air spring pressure of about 55 psi. The only limitation on lower pressure in the air springs is that enough pressure must be maintained therein to prevent air bag 52 from collapsing inwardly and rubbing against piston 50 which would quickly wear the air bag out. Accordingly, about 5 psi pressure must be maintained in the air spring. In the present example, at 5 psi, air springs 50, 52 provide about 300 lbs. support for the vehicle upon which the suspension units are mounted. Thus, the suspension units are capable of providing a soft though stable ride for any load ranging from about 300 lbs. to about 3,500 lbs.

In comparison, a conventional suspension having a through axle and mechanical springs designed for a maximum load of 3,500 lbs. has acceptable ride and stability characteristics only in a load range of from about 3,000 lbs. to 3,500 lbs. Below 3,000 lbs., the ride is objectionably stiff and rough. Above 3,500 lbs., the suspension becomes very unstable and is in danger of failure.

Thus, a pair of suspension units 34 can be used in conjunction with a vehicle expected to carry a wide range of loads or can be used in conjunction with various different vehicles whose load capacities vary widely. In comparison, a particular conventional mechanical suspension can be used only in applications having a relatively narrow load range.

Figure 2:
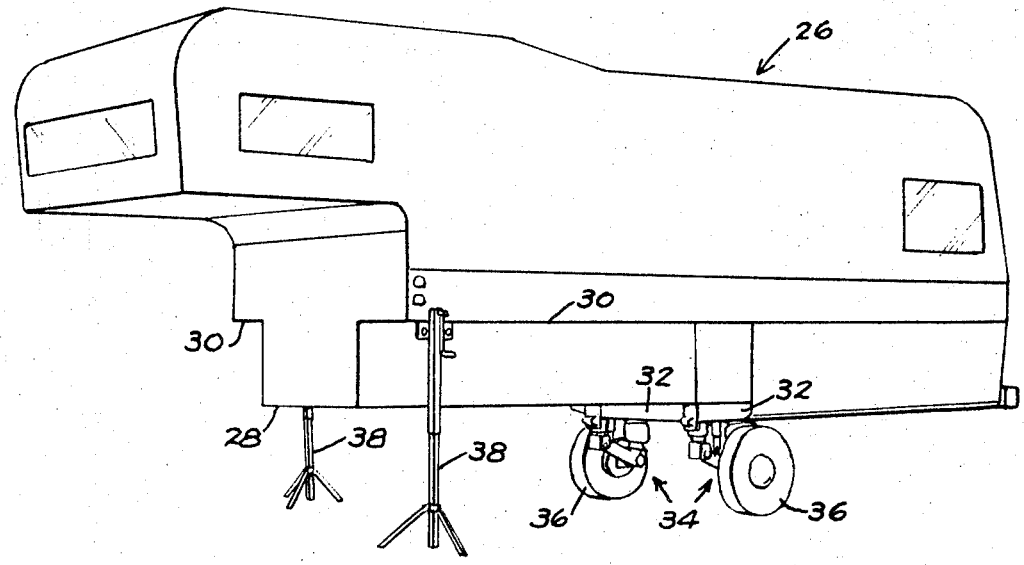
FIG. 2 is a perspective view of the camper body and its suspension separately.
Figure 5:
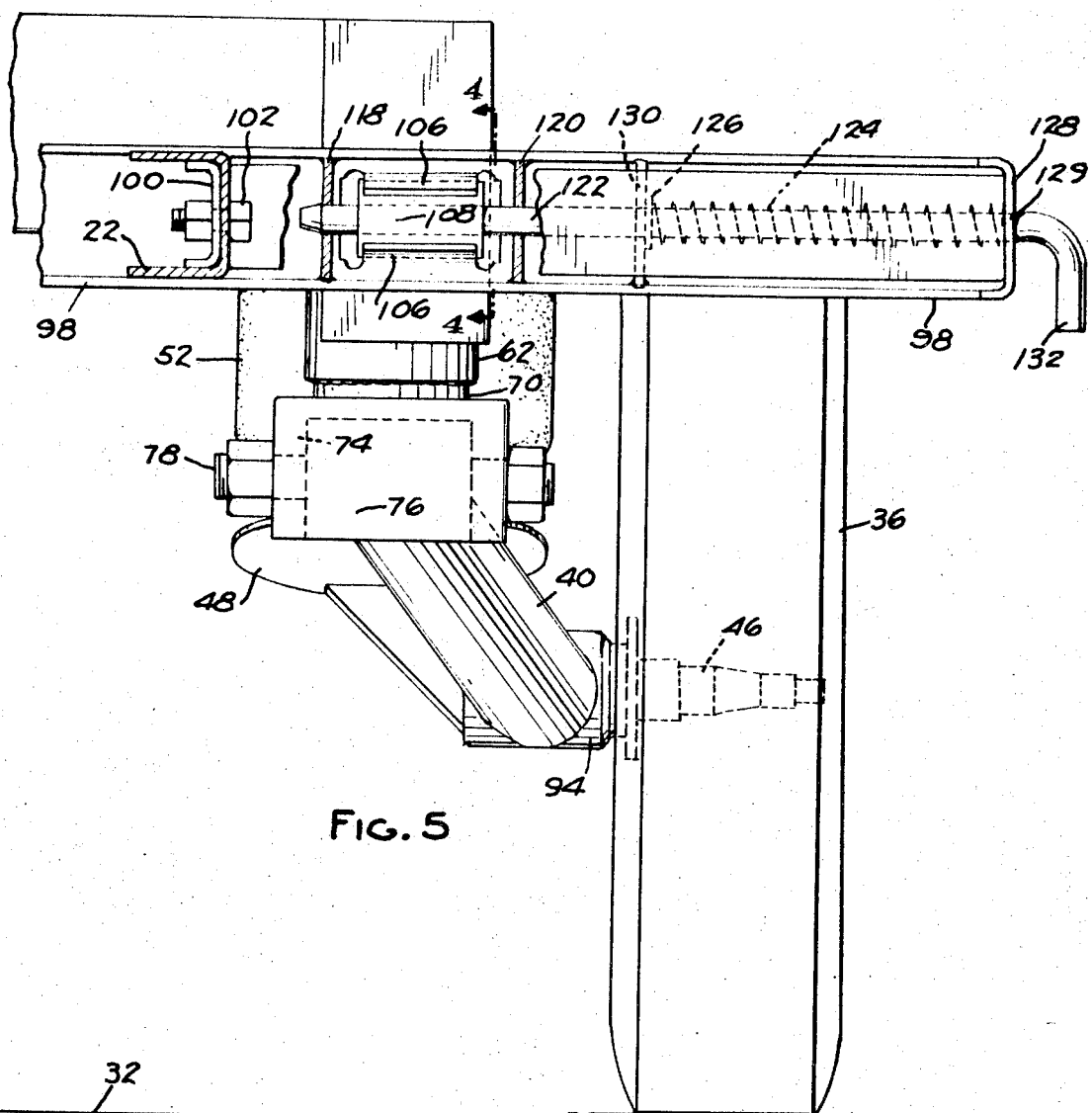
FIG. 5 is an end elevational view of the structure illustrated in FIG. 3.
Figure 6:
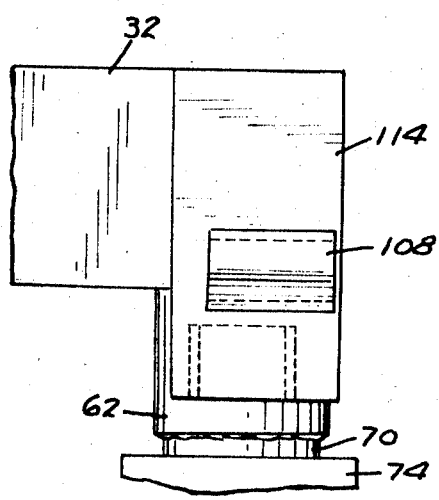
FIG. 6 is a fragmentary view similar to FIG. 5 with portions of the coupling structure removed.

To uncouple truck 20 from camper 26, legs 38 are lowered to the position of FIG. 2 and locking pins 122 and retracted outwardly to disengage them from hasp 108 and apertured webs 118, 120. Detent notch 134 is engaged with a side of opening 129 to secure the pins in retracted position. Truck 20 is then driven forwardly from beneath the camper body.

While the invention is specifically illustrated as being mounted on a camper body, it will be obvious that it could also be used in conjunction with land vehicles generally with or without couplings 96 with an additional vehicle such as truck 20.

I claim:

1. Suspension for suspending a wheel from the frame of a land vehicle comprising,
   a control arm having a wheel spindle extending laterally therefrom,
   mounting means having one member pivotally connected with said control arm and another member adapted to be mounted on a vehicle frame so that said control arm can swing up and down relative thereto,
   said members having portions comprising respectively a receptacle and an insert which extend in a generally vertical direction and which interfit loosely,
   said receptacle and insert being relatively tiltable in a horizontal direction and being relatively turnable about a generally vertical axis to adjust respectively the camber and toe-in of said spindle when said one member is mounted on said frame,
   said portions having regions adapted to be welded together to fix said spindle in adjusted position,
   and spring means adapted to be interposed in load-transmitting relation between said control arm and frame.

2. The structure defined in claim 1 wherein said receptacle and insert are generally cylindrical.

3. The structure defined in claim 2 wherein said cylindrical receptacle has an open end and said cylindrical insert has a base, said regions comprising portions of said receptacle and insert adjacent said open end and base.

4. The structure defined in claim 3 wherein said insert comprises said one member and said receptacle comprises said other member.

5. In combination, a land vehicle having a frame and a suspension as defined in claim 4 mounted thereon.

6. The structure defined in claim 4 wherein said spring means comprises an air spring.

7. In combination, a land vehicle having a frame and a suspension as defined in claim 1 mounted thereon.

8. The structure defined in claim 1 wherein said spring means comprises an air spring.

9. The structure defined in claim 1 wherein said control arm comprises a tube, a platform on said tube, said spring means comprising an air spring adapted to be so interposed between said platform and frame,
   the pivotal connection comprising elements on said tube and one member interconnected by a metal-to-metal pivot structure, said tube and wheel spindle having unitary construction,
   said tube and pivot structure being of themselves effective to control forces in said suspension which are lateral and torsional with respect to said tube.

10. In combination, a land vehicle having a frame and a suspension as defined in claim 9 mounted thereon.

* * * * *